(12) United States Patent
Park et al.

(10) Patent No.: US 12,338,331 B2
(45) Date of Patent: Jun. 24, 2025

(54) METHOD FOR PREPARING SUPERABSORBENT POLYMER

(71) Applicant: LG Chem, Ltd., Seoul (KR)

(72) Inventors: Se Yeol Park, Daejeon (KR); Gicheul Kim, Daejeon (KR); Yun Kyung Do, Daejeon (KR); Sangwon Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 715 days.

(21) Appl. No.: 17/630,999

(22) PCT Filed: Oct. 8, 2020

(86) PCT No.: PCT/KR2020/013748
§ 371 (c)(1),
(2) Date: Jan. 28, 2022

(87) PCT Pub. No.: WO2021/071291
PCT Pub. Date: Apr. 15, 2021

(65) Prior Publication Data
US 2022/0315715 A1 Oct. 6, 2022

(30) Foreign Application Priority Data
Oct. 8, 2019 (KR) .................. 10-2019-0124760
Oct. 8, 2020 (KR) .................. 10-2020-0129974

(51) Int. Cl.
*C08J 3/24* (2006.01)
*C08K 5/09* (2006.01)
*C08L 33/08* (2006.01)

(52) U.S. Cl.
CPC ........ *C08J 3/24* (2013.01); *C08K 5/09* (2013.01); *C08L 33/08* (2013.01)

(58) Field of Classification Search
CPC ......................... C08L 33/08; C08J 3/24
See application file for complete search history.

(56) References Cited

U.S. PATENT DOCUMENTS

| 5,248,709 | A  | 9/1993  | Brehm         |
| 7,153,910 | B2 | 12/2006 | Dairoku et al.|
| 7,282,262 | B2 | 10/2007 | Adachi et al. |
| 10,040,911| B2 | 8/2018  | Kim et al.    |
| 2006/0276598 | A1 | 12/2006 | Wada et al. |
| 2008/0269372 | A1 | 10/2008 | Dairoku et al. |
| 2011/0301560 | A1* | 12/2011 | Fujimura ............... C08J 3/12 525/384 |
| 2015/0259522 | A1* | 9/2015 | Lee ................... B01J 20/261 524/522 |
| 2017/0226295 | A1 | 8/2017 | Kim et al. |
| 2018/0305503 | A1 | 10/2018 | Lim et al. |
| 2019/0338082 | A1 | 11/2019 | Iwamura et al. |
| 2020/0247958 | A1 | 8/2020 | Park et al. |
| 2021/0113989 | A1 | 4/2021 | Hur et al. |

FOREIGN PATENT DOCUMENTS

| CN | 101475692 A    | 7/2009  |              |
| CN | 102482434 B  * | 5/2012  | .... C08J 3/12 |
| CN | 105131314 A    | 12/2015 |              |
| CN | 106750475 A    | 5/2017  |              |
| EP | 0885917 A2     | 12/1998 |              |
| EP | 1721663 A1     | 11/2006 |              |
| EP | 2650025 A1     | 10/2013 |              |
| EP | 3165558 A1     | 5/2017  |              |
| JP | S63-105064 A   | 5/1988  |              |
| JP | H03501494 A    | 4/1991  |              |
| JP | 2011092930 A   | 5/2011  |              |
| JP | 2012007062 A   | 1/2012  |              |
| KR | 20060009316 A  | 1/2006  |              |
| KR | 20150061270 A  | 6/2015  |              |
| KR | 20170106154 A  | 9/2017  |              |
| KR | 20190069103 A  | 6/2019  |              |
| KR | 20190069297 A  | 6/2019  |              |
| KR | 20190076715 A  | 7/2019  |              |
| KR | 20190087209 A  | 7/2019  |              |
| KR | 20210038081 A  | 4/2021  |              |
| WO | 2005075070 A1  | 8/2005  |              |
| WO | 2018062539 A1  | 4/2018  |              |
| WO | 2019143017 A1  | 7/2019  |              |

OTHER PUBLICATIONS

KONA Powder and Particle Journal No. 35 (2018) 226-250 (Year: 2018).*
Database WPI, Week 198824, Thomson Scientific, London, GB; AN 1988-165812. XP002807116.
Database WPI, Week 201963, Thomson Scientific, London, GB; AN 2019-60199H. XP002807115.
Extended European Search Report including Written Opinion for Application No. 20875565.2 dated Aug. 2, 2022, pp. 1-11.

(Continued)

Primary Examiner — Robert S Jones, Jr.
Assistant Examiner — Lily K Sloan
(74) Attorney, Agent, or Firm — Lerner David LLP

(57) ABSTRACT

This invention relates to a method for preparing a superabsorbent polymer, more specifically to a method for preparing a superabsorbent polymer that uses stearic acid or salts thereof in the process of reassembling fine powders, thereby improving processability in the preparation process of the superabsorbent polymer, and realizing excellent absorption properties.

8 Claims, No Drawings

(56) References Cited

OTHER PUBLICATIONS

International Search Report for PCTKR2020013748 dated Feb. 1, 2021, 2 pgs.
Odian, G, "Principles of Polymerization", "A Wiley-Interscience Publication—John Wiley & Sons", 1981, p. 203.
Schwalm, R., "UV Coatings Basics, Recent Developments and New Applications", Dec. 21, 2006, p. 115, Elsevier Science.
Third Party Observation for PCT/KR2020/013748 submitted Feb. 4, 2022. 7 pgs.

* cited by examiner

METHOD FOR PREPARING SUPERABSORBENT POLYMER

CROSS-REFERENCE TO RELATED APPLICATION(S)

This application is a national phase entry under 35 U.S.C. § 371 of International Application No. PCT/KR2020/013748, filed on Oct. 8, 2020, which claims priority to Korean Patent Application No. 10-2019-0124760, filed on Oct. 8, 2019, and Korean Patent Application No. 10-2020-0129974, filed on Oct. 8, 2020, the disclosures of which are herein incorporated by reference in their entirety.

BACKGROUND OF THE INVENTION

(a) Field of the Invention

This invention relates to a method for preparing superabsorbent polymer.

(b) Description of the Related Art

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as hygienic goods such as disposable diapers, sanitary pads, and the like, water-holding material for soil, water stop material for civil engineering and architecture, sheets for raising seedling, freshness preservatives in the field of food circulation, fomentation material, and the like.

The absorption mechanism of the superabsorbent polymer is influenced by osmotic pressure due to difference in the electric attractive force exhibited by the charge of polymer electrolyte, affinity between water and polymer electrolyte, interactions between molecular expansion by repulsive force between electrolyte ions and the inhibition of expansion due to crosslinking. Namely, absorptiveness of superabsorbent polymer is dependent upon the above explained affinity and molecular expansion, and the absorption speed is largely determined by the osmotic pressure of absorbent polymer itself.

Meanwhile, particles having particle diameters of 150 μm or less, inevitably produced during the preparation process of superabsorbent polymer, are referred to as fine powders (fines), and they are known to be generated at a rate of about 20 to 30% during grinding or transfer in the preparation process of superabsorbent polymer. In case such fines are included in superabsorbent polymer, the main properties of superabsorbent polymer such as absorption under pressure or permeability may be decreased. For this reason, during the preparation process of superabsorbent polymer, particularly during a classification process, such fines are separated and superabsorbent polymer is prepared only from the remaining polymer particles.

And, the separated fines are prepared into large particles again through a reassembling process, and such reassembled particles are prepared/used again as superabsorbent polymer. Particularly, as a representative of such reassembling method, a method of preparing fine powder reassembly and superabsorbent polymer, by mixing the fines and water to aggregate, is known.

However, in such a reassembling process, if the amount of water used is increased, the amount of energy used may increase when drying, and thus, process cost may increase, and furthermore, in case moisture is not sufficiently removed by drying after reassembling, load of equipment for the preparation of superabsorbent polymer may be increased.

To the contrary, in case the amount of water used is decreased during the reassembling process, the aggregation strength of reassembly may not be sufficient, and thus, reassembling may not be sufficiently achieved, and the reassembly may return to fines again, thus significantly increasing the amount of refines generated, and the properties such as absorption capacity of superabsorbent polymer prepared by the reassembling process may not be sufficient.

And, Korean Laid-Open Patent Publication No. 2019-0076715 discloses a process of reassembling fines, comprising steps of mixing fines with water, reassembling them to prepare fine powder reassembly, and compressing and cutting the fine powder reassembly to prepare compressed fine powder reassembly. However, this process has disadvantages in that when applied for the preparation of superabsorbent polymer having high centrifuge retention capacity, stickness between particles increases, and thus, loads in compressor and dryer are high, thus decreasing stability of the reassembling process.

Therefore, there is a continued demand for the development of a method for reassembling fines that can solve the above explained problems.

SUMMARY OF THE INVENTION

It is an object of the invention to provide a method for preparing superabsorbent polymer that can solve the above explained problems, by using stearic acid or salts thereof, when reassembling fines inevitably obtained during the preparation process of superabsorbent polymer.

In order to achieve the object, there is provided a method for preparing superabsorbent polymer, comprising steps of:
  preparing a monomer composition comprising acrylic acid based monomers having acid groups of which at least a part are neutralized, an internal crosslinking agent, and a polymerization initiator;
  conducting crosslinking polymerization of the monomer composition to form hydrogel polymer;
  drying and grinding the hydrogel polymer, and classifying into base resin normal particles having particle diameters greater than 150 μm and 850 μm or less, and fine powders having particle diameters of 150 μm or less; and
  mixing the fine powders with stearic acid or salts thereof to prepare fine powder reassembly.

According to one embodiment of the invention, there is provided a method for preparing superabsorbent polymer having excellent absorption properties, inhibited stickness between particles, and improved bulk density and flowability, by effectively reassembling fines inevitably obtained in the preparation process of superabsorbent polymer.

DETAILED DESCRIPTION OF THE EMBODIMENTS

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

As used herein, terms "a first", "a second" and the like are used to explain various constructional elements, and they are used only to distinguish one constructional element from other constructional elements.

And, the terms used herein are only to explain specific embodiments, and are not intended to limit the present invention.

A singular expression includes a plural expression thereof, unless it is expressly stated or obvious from the context that such is not intended.

As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

And, in case it is stated that each constructional element is formed "on" or "above" each construction element, it means that each constructional element is formed right above each constructional element, or that other constructional elements may be additionally formed between the layers or on the object or substrate.

Hereinafter, a method for preparing superabsorbent polymer according to one embodiment of the invention will be explained in detail.

A method for preparing superabsorbent polymer according to one embodiment of the invention comprises steps of: preparing a monomer composition comprising acrylic acid based monomers having acid groups of which at least a part are neutralized, an internal crosslinking agent, and a polymerization initiator; conducting crosslinking polymerization of the monomer composition to form hydrogel polymer; drying and grinding the hydrogel polymer, and classifying into base resin normal particles having particle diameters greater than 150 μm and 850 μm or less, and fine powders having particle diameters of 150 μm or less; and mixing the fine powders with stearic acid or salts thereof to prepare fine powder reassembly.

For reference, the term "polymer" used herein means the polymerized state of acrylic acid based monomers, and may include those of all moisture content ranges or particle diameter ranges. Among the polymers, those having moisture content of about 40 wt % or more after polymerized and before dried may be designated as hydrogel polymer. And, among the polymers, those having particle diameters of 150 μm or less may be designated as "fine powders (fines)".

And, the term "superabsorbent polymer" means the polymer itself, or it is used to include those made to be appropriate for productization through additional processes, for example, surface crosslinking, fine powder reassembling, drying, grinding, classification, and the like, according to the context.

As used herein, the term "base resin" or "base resin powder" means particles or powders made by drying and grinding of polymer of acylic acid based monomers, and it means polymer that is not surface modified or surface crosslinked as explained later.

The inventors of the present disclosure discovered that in case stearic acid or a salt thereof is used as a binder when reassembling fine powders, fine powder reassembly having excellent absorption properties, in which stickiness between particles is inhibited, and bulk density and flowability are improved, can be obtained, and completed the invention.

First, in the preparation method of superabsorbent polymer of the present disclosure, a monomer composition, which is the raw material of the superabsorbent polymer, comprises acrylic acid based monomers having acid groups of which at least a part are neutralized, and a polymerization initiator.

The acrylic acid based monomer is a compound represented by the following Chemical Formula 1:

$$R^1\text{—}COOM^1 \quad \text{[Chemical Formula 1]}$$

In the Chemical Formula 1,
  $R^1$ is a C2-5 alkyl group comprising an unsaturated bond,
  $M^1$ is a hydrogen atom, a monovalent or divalent metal, an ammonium group or an organic amine salt.

Preferably, the acrylic acid based monomers may be one or more selected from the group consisting of acrylic acid, (meth)acrylic acid, and monovalent metal salts, divalent metal salts, ammonium salts and organic amine salts of these acids.

Wherein, the acrylic acid based monomers have acid groups, and at least a part of the acid groups may be neutralized. Preferably, monomers partially neutralized with alkali material such as sodium hydroxide, potassium hydroxide, calcium hydroxide, ammonium hydroxide, and the like may be used. Wherein, the neutralization degree of the acrylic acid based monomers may be 40 to 95 mol %, or 40 to 80 mol %, or 45 to 75 mol %. Although the range of the neutralization degree may vary according to the final properties, if the neutralization degree is too high, neutralized monomers may be precipitated, thus rendering smooth progression of polymerization difficult, and to the contrary, if the neutralization degree is too low, the absorption of the polymer may be significantly lowered, and the polymer may exhibit rubber-like property, which is difficult to handle.

The concentration of the acrylic acid based monomers may be about 20 to about 60 wt %, preferably about 40 to about 50 wt %, based on the monomer composition comprising raw materials and solvents, and it may be appropriately adjusted considering polymerization time and reaction conditions, and the like. However, if the concentration of the monomers is too low, yield of superabsorbent polymer may decrease, thus causing a problem in terms of economical efficiency, and if the concentration is too high, the monomers may be partially precipitated or grinding efficiency during grinding of polymerized hydrogel polymer may be low, thus causing process problems, and the properties of superabsorbent polymer may be deteriorated.

In the preparation method of superabsorbent polymer of the invention, the polymerization initiator used during polymerization is not specifically limited as long as it is commonly used for the preparation of superabsorbent polymer.

Specifically, as the polymerization initiator, a thermal polymerization initiator or a photopolymerization initiator may be used according to polymerization method. However, even in the case of photopolymerization, since a certain amount of heat is generated by UV irradiation, etc., and heat is generated to some degree according to the progression of an exothermic polymerization reaction, a thermal polymerization initiator may be additionally used.

As the photopolymerization initiator, any compounds capable of forming radicals by light such as UV may be used without limitations.

As the photopolymerization initiator, one or more selected from the group consisting of benzoin ether, dialkyl acetophenone, hydroxyl alkylketone, phenyl glyoxylate, benzyl dimethyl ketal, acyl phosphine, and α-aminoketone may be used. As specific examples of the acyl phosphine, commercially available lucirin TPO, namely 2,4,6-trimethyl-benzoyl-trimethyl phosphine oxide) may be used. More various photopolymerization initiators are described in Reinhold Schwalm, "UV Coatings: Basics, Recent Developments and New Application (Elsevier 2007)", page 115, and are not limited to the above described examples.

The photopolymerization initiator may be included in the concentration of about 0.01 to about 1.0 wt %, based on the monomer composition. If the concentration of the photopolymerization initiator is too low, polymerization speed may become slow, and if the concentration of the photopolymerization initiator is too high, the molecular weight of superabsorbent polymer may be small and the properties may become non-uniform.

And, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4)_2S_2O_8$), etc., and, specific examples of the azo initiator may include 2,2-azobis (2-amidinopropane)dihydrochloride, 2,2-azobis-(N,N-dimethylene)isobutyramidinedihydrochloride, 2-(carbamoylazo)isobutyronitril, 2,2-azobis[2-(2-imidazolin-2-yl)propane]dihydrochloride, 4,4-azobis-(4-cyanovalericacid), etc. More various thermal initiators are described in "Principle of Polymerization (Wiley, 1981)", Odian, page 203, and are not limited to the above described examples.

The thermal polymerization initiator may be included at the concentration of about 0.001 to about 0.5 wt %, based on the monomer composition. If the concentration of the thermal polymerization initiator is too low, additional thermal polymerization may hardly occur, and thus, the effect according to the addition of the thermal polymerization initiator may be insignificant, and if the concentration of the thermal polymerization initiator is too high, the molecular weight of superabsorbent polymer may be small and the properties may become non-uniform.

According to one embodiment of the invention, the monomer composition may further comprise an internal crosslinking agent as raw material of the superabsorbent polymer. As the internal crosslinking agent, a crosslinking agent having one or more functional groups capable of reacting with the water soluble substituents of the acrylic acid based monomers, and having one or more ethylenically unsaturated groups; or a crosslinking agent having two or more functional groups capable of reacting with the water soluble substituents of the acrylic acid based monomers and/or water soluble substituents formed by hydrolysis of the monomers, may be used.

As specific examples of the internal crosslinking agent, C8-12 bisacrylamide, bismethaacrylamide, C2-10 polypol poly(meth)acrylate or C2-10 polyol poly(meth)allylether, and the like may be mentioned, and more specifically, one or more selected from the group consisting of N, N'-methylenebis(meth)acrylate, ethyleneoxy(meth)acrylate, polyethyleneoxy(meth)acrylate, propyleneoxy(meth)acrylate, glycerin diacrylate, glycerin triacrylate, trimethylol triacrylate, triallylamine, triaryl cyanurate, triallyl isocyanate, polyethyleneglycol, diethyleneglycol and propyleneglycol may be used.

Such an internal crosslinking agent may be used in the concentration of 0.01 to 0.5 wt %, based on the monomer composition, thus crosslinking polymerized polymer.

In the preparation method of the present disclosure, the monomer composition of the superabsorbent polymer may further comprise additives such as a thickener, a plasticizer, a preservation stabilizer, an antioxidant, etc., as necessary.

The raw materials, such as acrylic acid based monomers having acid groups of which at least a part are neutralized, a photopolymerization initiator, a thermal polymerization initiator, an internal crosslinking agent and additives, may be prepared in the form of a monomer composition solution dissolved in a solvent.

Wherein, a solvent that can be used is not limited in terms of its construction as long as it can dissolve or disperse the above explained raw materials, and for example, one or more selected from water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination.

The solvent may be included in the remaining amount except the above described components, based on the total amount of the monomer composition.

Meanwhile, a method of forming hydrogel polymer by thermal polymerization or photopolymerization of the monomer composition is not specifically limited, as long as it is a commonly used polymerization method.

Specifically, the polymerization method is largely classified into thermal polymerization and photopolymerization according to energy source. Commonly, thermal polymerization may be progressed in a reactor equipped with a stirring axis such as a kneader, and photopolymerization may be progressed in a reactor equipped with a movable conveyer belt, but the above explained polymerization is no more than one example, and the present disclosure is not limited thereto.

For example, hydrogel polymer may be obtained by introducing the above described monomer composition into a reactor equipped with a stirring axis such as a kneader, and supplying hot air or heating the reactor to progress thermal polymerization. Wherein, the hydrogel polymer discharged to the outlet of the reactor may be obtained in the size of a few centimeters to a few millimeters according to the shape of the stirring axis equipped in the reactor. Specifically, the size of obtained hydrogel polymer may vary according to the concentration of the introduced monomer composition and the introduction speed, etc., and commonly, hydrogel polymer with weight average particle diameter of 2 to 50 mm may be obtained.

And, in case photopolymerization is progressed in a reactor equipped with a movable conveyer belt as explained above, the obtained hydrogel polymer may be in the form of a sheet having the width of the belt. Wherein, the thickness of the polymer sheet may vary according to the concentration of the introduced monomer mixture and the introduction speed, but, commonly, a monomer mixture is preferably fed such that polymer in the form of a sheet having a thickness of about 0.5 cm to about 5 cm may be obtained. In case a monomer mixture is fed such that the thickness of sheet-shaped polymer may be too thin, production efficiency may be low, and if the thickness of the sheet-shaped polymer is greater than 5 cm, due to the too thick thickness, a polymerization reaction may not uniformly occur throughout the entire thickness.

Wherein, the moisture content of hydrogel polymer obtained by such a method may be about 40 to about 80 wt %. Throughout the specification, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. Wherein, the drying condition is set up such that the temperature is raised from room temperature to about 180° C. and then maintained at 180° C., and the total drying time is 20 minutes including a temperature raising step of 5 minutes.

Next, the hydrogel polymer is dried, ground and classified to form base resin. Wherein, as necessary, a coarse grinding step may be further conducted before drying so as to increase drying efficiency.

Wherein, grinders that can be used in the coarse grinding are not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but the present disclosure is not limited thereto.

Wherein, the grinding step may be progressed such that particle diameter of polymer may become about 2 to about 10 mm.

Grinding to a particle diameter of less than 2 mm would not be technically easy due to the high moisture content of the hydrogel polymer, and may generate aggregation between the ground particles. Meanwhile, if grinding to a particle diameter greater than 10 mm, the effect of increasing the efficiency of the subsequent drying step may be insignificant.

The polymer coarsely ground as explained above, or polymer immediately after polymerization that does not pass through the coarse grinding step is dried, and the drying temperature may be about 150° C. to about 250° C. If the drying temperature is less than about 150° C., a drying time may too lengthen, and the properties of the finally prepared superabsorbent polymer may be deteriorated, and if the drying temperature is greater than about 250° C., only the surface of hydrogel polymer may be dried, thus generating fines in the subsequent grinding process, and the properties of the finally prepared superabsorbent polymer may be deteriorated. Preferably, the drying may be progressed at a temperature of about 150 to 200° C., more preferably at 160 to 180° C.

Meanwhile, the drying may be progressed for about 20 minutes to about 90 minutes considering the process efficiency, but it not limited thereto.

And, the drying method is not limited in terms of the construction as long as it can be commonly used as a drying process of hydrogel polymer. Specifically, the drying step may be progressed by hot wind supply, infrared ray irradiation, ultrahigh frequency wave irradiation, or UV irradiation, etc. The polymer dried by such a method may exhibit a moisture content of about 5 to about 10 wt %.

Next, a step of grinding dried polymer obtained through the drying step is conducted.

The polymer powder obtained after the grinding step may have a particle diameter of about 150 to about 850 μm. As a grinder used for grinding to such a particle diameter, specifically, a pin mill, a hammer mill, a screw mill, a roll mill, a disc mill, or a jog mill, etc. may be used, but the present disclosure is not limited thereto.

And, in order to manage the properties of superabsorbent polymer powder finally productized after the grinding step, a process of classifying the polymer powders obtained after grinding according to particle diameters may be conducted. Preferably, the particles are classified into particles having particle diameters of 150 μm or less and particles having particle diameters greater than about 150 μm and 850 μm or less.

Throughout the specification, unless specifically otherwise described, "particle diameter or particle size" may be measured by standard sieve analysis or laser diffraction method, preferably standard sieve analysis, and "average particle diameter or weight average particle diameter" means particle diameter (D50) constituting 50% of weight percentage in the particle size distribution curve obtained through a laser diffraction method.

And, throughout the specification, fine particles below a specific particle size, namely particles having a particle size of about 150 μm or less, are referred to as base resin fine powder, superabsorbent polymer fine powder, SAP fine powder or fine powder (fines), and base resin particles having particle diameters greater than 150 μm and 850 μm or less are referred to as baser resin normal particles, or normal particles.

The fine powder may be generated during polymerization, drying or grinding of dried polymer, but if fine powder is included in the final product, handling may be difficult and gel blocking may occur, thus deteriorating the properties. Thus, it is preferable to exclude fine powder in the final product or reassemble fine powder to normal particles.

For example, a reassembling process of aggregating the fine powders to normal particle size may be conducted. In the reassembling process, generally, in order to increase aggregation strength, the fine powders are aggregated in wet states. Wherein, as the moisture content of the fine powder is higher, aggregation strength increases, but excessively large reassembled mass may be generated during the reassembling process, thus causing problems during process operation, and if the moisture content is low, the reassembling process may be easy, but aggregation strength may be low, and thus, fine powder reassembly may be crushed into fine powders again after the reassembling process (reatomization)

And, the fine powder reassembly thus obtained may have decreased centrifuge retention capacity (CRC) or absorption under pressure (AUP) compared to normal particles, thus causing quality deterioration of superabsorbent polymer.

However, as explained above, in the preparation method according to one embodiment of the invention, by mixing the fine powders with stearic acid or a salt thereof, fine powder reassembly having high aggregation strength but less stickness, and excellent absorption properties may be obtained.

The stearic acid is hydrophobic saturated fatty acid consisting of 18 carbon atoms, is amphipathic, and gives hydrophobicity to the surface of fine powder reassembly. Due to the characteristics, when it is mixed with fine powder to prepare fine powder reassembly, fine powder reassembly having decreased stickness but high aggregation strength may be formed.

As the stearic acid salt, lithium stearate, aluminum stearate, ammonium stearate, calcium stearate, magnesium stearate, potassium stearate, sodium stearate, or zinc stearate, and the like may be mentioned.

The stearic acid or a salt thereof may be mixed in the amount of 0.05 parts by weight or more, or 0.10 parts by weight or more, or 0.14 parts by weight or more, and 0.30 parts by weight or less, or 0.20 parts by weight or less, or 0.16 parts by weight or less, based on 100 parts by weight of fines. Within the above content ranges, fine powder reassembly that not only exhibits excellent absorption properties, but also exhibits excellent mechanical properties such as aggregation strength, and the like may be prepared.

The stearic acid or a salt thereof may be dry mixed with the fine powder in the solid state, or dissolved in a solvent and mixed in the form of a solution. And, the stearic acid or a salt thereof may be heated above a melting temperature and mixed in the molten state.

In case the stearic acid or a salt thereof is heated above a melting temperature and mixed in the molten state, stearic acid or a salt thereof may be uniformly dispersed in the fine powder.

In the preparation step of fine powder reassembly, using a mixing device or mixer capable of adding shear force, the fine powder and stearic acid or a salt thereof may be stirred at a speed of about 10 to about 2000 rpm, or about 100 to about 1000 rpm, or about 500 to about 800 rpm and mixed.

After preparing fine powder reassembly by the above process, a step of drying the fine powder reassembly may be further conducted.

The drying temperature may be controlled according to the content of water added in the preparation step of fine powder reassembly, and the like. For example, the drying process in the preparation step of fine powder reassembly may be conducted at about 120 to about 220° C. to form fine powder reassembly having improved aggregation strength through covalent bond, and control the moisture content of fine powder reassembly to about 1 to about 2 wt % within an appropriate time.

Although the drying process may be conducted using a common drying apparatus, according to one embodiment of the invention, it may be conducted using a hot air dryer, a paddle type dryer or a forced circulation type dryer, and the like. And, a temperature rise means for drying is not limited in terms of its construction. Specifically, heating medium may be supplied, or direct heating such as electric heating may be conducted, but the invention is not limited thereto. Specifically, as a heat source that can be used, steam, electricity, ultraviolet rays, infrared rays, and the like may be mentioned, and heated thermal fluid, and the like may be used.

According to one embodiment of the invention, after preparing fine powder reassembly as explained above, a step of preparing compressed fine powder reassembly using the fine powder reassembly may be further conducted, as necessary. Specifically, the step of preparing such compressed fine powder reassembly may comprise compressing, grinding and classifying the fine powder reassembly to prepare compressed fine powder reassembly, and particularly, may comprise a step of compressing the fine powder reassembly at a temperature of 40 to 105° C., or 40 to 90° C., or 45 to 75° C.

The compression process of fine powder reassembly may be conducted using a common extruder capable of compressing and cutting fine powder reassembly, such as a meat chopper, and the cutting process may be conducted with a cutter such as a blade or scraper, installed at the later stage of the compression process, for example, at a hole plate discharge port.

For example, in case a meat chopper equipped with two blades at the hole plate discharge port is used, fine powder reassembly is first introduced into the meat chopper, and then, the fine powder reassembly is compressed by the meat chopper, and the compressed fine powder reassembly is cut into particles by the blades positioned at the hole plate discharge port. Wherein, the compressed fine powder reassemblies cut into particles are recombined at the cut parts due to adhesive properties, and become secondary particles in the form of stems.

Next, in the preparation method of superabsorbent polymer according to one embodiment of the invention, a step of grinding the above prepared fine powder reassembly or compressed fine powder reassembly, and classifying into fine powder reassembly (hereinafter, referred to as 'refines') and normal particle reassembly, as necessary, may be further progressed.

Since the fine powder reassembly obtained through the step of preparing fine powder reassembly has high aggregation strength, a rate of being recrushed into fine powder after being ground, namely a rate of reatomization, is low.

The grinding of the fine powder reassembly may be conducted such that the particle diameter of the fine powder reassembly may become about 150 to about 850 μm. As a grinder used to grind to such a particle diameter, specifically, a pin mill, a hammer mill, a screw mill, a roll mill, a disc mill or a jog mill, and the like may be used, but the present disclosure is not limited thereto.

After the grinding step, in order to manage the properties of finally productized superabsorbent polymer powder, in general, polymer powder obtained after grinding is classified according to particle diameter. Preferably, a step of classifying into refines having particle diameters of 150 μm or less, and normal particle reassembly having particle diameter of greater than 150 μm and 850 μm or less is conducted.

And, in the preparation method of superabsorbent polymer according to one embodiment, fine powder reassembly prepared by the above explained method, particularly, normal particle reassembly may be mixed with base resin normal particles and surface crosslinked to prepare superabsorbent polymer.

Specifically, after classification, refines having particle diameters of 150 μm or less may be recycled to the fine powder reassembling process, and normal particle reassembly having particle diameter of greater than 150 μm and 850 μm or less may be mixed with the above explained base resin normal particles. And, after the mixing process, the normal particle reassembly and normal particles may be additionally introduced in a surface crosslinking mixer and surface crosslinking may be optionally conducted.

The surface crosslinking is a step of increasing the crosslinking density around the surfaces of superabsorbent polymer particles, in relation to the crosslinking density inside of the particles. In general, since the surface crosslinking agent is applied on the surfaces of superabsorbent polymer particles, the surface crosslinking reaction occurs on the surfaces of superabsorbent polymer particles, thereby improving crosslinkability on the surfaces of particles without substantially influencing the inside of the particles. Thus, surface crosslinked superabsorbent polymer particles have higher crosslinking degree around the surfaces than inside.

Wherein, the surface crosslinking agent is not limited as long as it is a compound capable of reacting with the functional groups of polymer.

Preferably, in order to improve the properties of produced superabsorbent polymer, as the surface crosslinking agent, one or more selected from the group consisting of polyhydric alcohol; epoxy compounds; polyamine compound; haloexpoy compounds; condensation products of haloexpoy compounds; oxazoline compounds; mono-, di- or polyoxazolidinone compounds; cyclic urea compound; multivalent metal salts; and alkylene carbonate may be used.

Specifically, as the examples of the polyhydric alcohol compounds, one or more selected from the group consisting of mono-, di-, tri-, tetra- or polyethylene glycol, monopropylene glycol, dipropylene glycol, polypropylene glycol, 2,3,4-trimethyl-1,3-pentanediol, glycerol, polyglycerol, 2-butene-1,4-diol, 1,4-butanediol, 1,3-butanediol, 1,5-pentanediol, 1,6-hexanediol, and 1,2-cyclohexandimethanol may be used.

And, as the epoxy compounds, one or more selected from the group consisting of ethylene glycol diglycidyl ether and glycidol, and the like may be used, and as the polyamine compounds, ethylenediamine, diethylenetriamine, triethylenetetraamine, tetraethylenepentamine, pentaethylenehexamine, polyethyleneimine and polyamide polyamine may be used.

And, as the haloepoxy compounds, epichlorohydrin, epibromohydrin, and α-methylepichlorohydrin may be used. Meanwhile, as the mono-, di- or polyoxazolidinone compounds, for example, 2-oxazolidinone may be used.

And, as the alkylene carbonate compounds, ethylene carbonate, and the like may be used. These compounds may be used alone or in combinations. Meanwhile, in order to increase the efficiency of the surface crosslinking process, it is preferable to include one or more polyhydric alcohol compounds among the surface crosslinking agents, and more preferably, C2 to 10 polyhydric alcohol compounds may be used.

The content of the surface crosslinking agent added may be appropriately selected according to the kind of surface crosslinking agents or reaction conditions, but commonly, it may be used in the content of about 0.001 to about 5 parts by weight, preferably about 0.01 to about 3 parts by weight, more preferably about 0.05 to about 2 parts by weight, based on 100 parts by weight of polymer.

If the content of the surface crosslinking agent is too small, a surface crosslinking reaction may hardly occur, and if the content of the surface crosslinking agent is too large, due to excessive surface crosslinking reaction, absorption capacity and properties may be deteriorated.

By heating polymer particles to which a surface crosslinking agent is added, surface crosslinking and drying may be simultaneously achieved.

A temperature rise means for the surface crosslinking reaction is not specifically limited. A heating medium may be supplied, or a heat source may be directly supplied to heat. Wherein, the kinds of the heating medium that can be used may include temperature-increased fluid such as steam, hot air, hot oil, etc., but are not limited thereto, and may be appropriately selected considering the means of the heating medium, temperature rise speed and a temperature to be increased. Meanwhile, the heat source directly supplied may include electric heating, gas heating, etc., but is not limited thereto.

And, after the surface crosslinking, classification into surface crosslinked fine powders having particle diameters of 150 μm or less, and surface crosslinked normal particles having particle diameters of greater than 150 μm and 850 μm or less may be conducted, and the surface crosslinked fine powders having particle diameters of 150 μm or less may be reintroduced into a process for reassembling fine powders, and the surface crosslinked normal particles may be productized and used.

The superabsorbent polymer of the present disclosure, prepared by the above preparation method, may have centrifuge retention capacity (CRC) measured according to EDANA method WSP 241.3, of about 34 g/g or more, or about 35 g/g or more, or about 36 g/g or more, and about 42 g/g or less, or about 41 g/g or less, or about 39 g/g or less.

And, the superabsorbent polymer may have absorption under pressure of 0.9 psi measured according to EDANA method WSP 242.3, of about 22 g/g or more, or about 23 g/g or more, or about 24 g/g or more, and about 28 g/g or less, or about 27 g/g or less, or about 26 g/g or less.

And, the superabsorbent polymer may have bulk density measured according to EDANA method WSP 250.3, of about 0.70 g/ml or more, or about 0.71 g/ml or more, or about 0.72 g/ml or more, or about 0.73 g/ml or more, and about 0.80 g/ml or less, or about 0.78 g/ml or less, or about 0.76 g/ml or less.

And, the superabsorbent polymer may exhibit high flowability measured according to EDANA method WSP 250.3, of 11.0 g/sec or more, or 12.0 g/sec or more, or 12.5 g/sec or more, and 20.0 g/sec or less, or 18.0 g/sec or less, or 16.0 g/sec or less. For the measurement method of flowability, examples below may be referred to.

The present disclosure will be explained in more detail in the following examples. However, these examples are presented only as the illustrations of the invention, and the scope of the invention is not limited thereby.

EXAMPLE

Preparation of Base Resin

Preparation Example 1

100 g of acrylic acid, 123.5 g of 32% caustic soda (NaOH), 0.12 g of a thermal polymerization initiator sodium persulfate, 0.008 g of a photopolymerization initiator diphenyl(2,4,6-trimethylbenzoyl)phosphine oxide, 0.16 g of a crosslinking agent polyethyleneglycol diacrylate, and 48.5 g of water were mixed to prepare a monomer mixture having a monomer concentration of 43.6 wt %.

And then, the monomer mixture was fed on a rotary belt having a width of 10 cm and a length of 2 m, and rotating at a speed of 50 cm/min. Simultaneously with feeding of the monomer mixture, UV was irradiated (irradiation amount: 10 mW/cm$^2$) to progress UV polymerization for 60 seconds, thus obtaining hydrogel polymer.

The hydrogel polymer was ground using a meat chopper to obtain coarsely ground hydrogel polymer. It was dried in a hot air dryer of 200° C. for 32 minutes, and ground with a grinder, and then, classified with a ASTM standard sieve to obtain base resin normal particles having particles sizes of greater than 150 μm and 850 μm or less, and fine particles having particles diameters of 150 μm or less.

Preparation of Superabsorbent Polymer

Example 1

(Reassembling Step)

In a high speed mixer rotating at 650 rpm, 300 g of the fine particles obtained in Preparation Example 1, and 0.45 g of stearic acid (MP-100, LG Household & Health Care) were mixed in a solid state, and then, 120 g of water was introduced, and they were mixed for 1 minute, thus preparing fine powder reassembly.

(Compression Step)

400 g of the fine powder reassembly prepared above were mixed with 80 g of water, and introduced into a compressor equipped with a 18 mm hole plate and discharged, thus obtaining compressed fine powder reassembly. The obtained compressed fine powder reassembly was put in a paddle type dryer of 180° C. and dried for 45 minutes, and then, ground using 2-stage rolling mill, thus preparing compressed fine powder reassembly normal particles having particles sizes of greater than 150 μm and 850 μm or less.

(Surface Crosslinking Step)

80 g of the base resin normal particles of Preparation Example 1 and 20 g of the compressed fine powder reassembly normal particles were mixed, and a mixed solution comprising 3.7 g of water, 0.1 g of propylene glycol, 0.4 g of ethylene carbonate, 0.4 g of propylene carbonate, and 0.87 g of aluminum sulfate aqueous solution was introduced therein, and mixed for 2 minutes. The mixture was dried at 185° C. for 60 minutes, and then, classified with ASTM standard sieve, and superabsorbent polymer having particle size of greater than 150 μm and 850 μm or less was selected.

Example 2

(Reassembling Step)

In a high speed mixer rotating at 650 rpm, 300 g of the fine particles obtained in Preparation Example 1, and 0.9 g of stearic acid (MP-100, LG Household & Health Care) were mixed in a solid state, thus preparing fine powder reassembly.

Thereafter, compression and surface crosslinking steps were conducted by the same method as Example 1 to prepare superabsorbent polymer.

Example 3

(Reassembling Step)

After putting 300 g of the fine particles obtained in Preparation Example 1 into a high speed mixer rotating at 650 rpm, and 0.45 g of stearic acid (MP-100, LG Household & Health Care) molten at 80° C. for 10 minutes were sprayed and mixed. And then, 120 g of water was introduced and mixed for 1 minute, thus preparing fine powder reassembly.

Thereafter, compression and surface crosslinking steps were conducted by the same method as Example 1 to prepare superabsorbent polymer.

Example 4

(Reassembling Step)

After putting 300 g of the fine particles obtained in Preparation Example 1 into a high speed mixer rotating at 650 rpm, and 0.9 g of stearic acid (MP-100, LG Household & Health Care) molten at 80° C. for 10 minutes were sprayed and mixed. And then, 120 g of water was introduced and mixed for 1 minute, thus preparing fine powder reassembly.

Thereafter, compression and surface crosslinking steps were conducted by the same method as Example 1 to prepare superabsorbent polymer.

Example 5

(Reassembling Step)

In a high speed mixer rotating at 650 rpm, 300 g of the fine particles obtained in Preparation Example 1, and 0.45 g of stearic acid (MP-100, LG Household & Health Care) were mixed in a solid state, and then, 120 g of water was introduced and mixed for 1 minute, thus preparing fine powder reassembly.

(Compression Step)

The compression step was conducted by the same method as Example 1.

(Surface Crosslinking Step)

80 g of the base resin normal particles of Preparation Example 1 and 20 g of the compressed fine powder reassembly normal particles were mixed, and a mixed solution comprising 3.7 g of water, 0.1 g of propylene glycol, 0.4 g of ethylene carbonate, 0.4 g of propylene carbonate, and 0.87 g of aluminum sulfate aqueous solution was introduced therein, and mixed for 2 minutes. The mixture was dried at 185° C. for 80 minutes, and then, classified with ASTM standard sieve, and superabsorbent polymer having particle size of greater than 150 μm and 850 μm or less was selected.

Comparative Example 1

(Reassembling Step)

In a high speed mixer rotating at 650 rpm, 300 g of the fine particles obtained in Preparation Example 1, and 120 g of water were introduced and mixed for 1 minute, thus preparing fine powder reassembly.

And then, compression and surface crosslinking steps were conducted by the same method as Example 1 to prepare superabsorbent polymer.

Comparative Example 2

(Reassembling Step)

In a high speed mixer rotating at 650 rpm, 300 g of the fine particles obtained in Preparation Example 1, and 120 g of water were introduced and mixed for 1 minute, thus preparing fine powder reassembly.

(Compression Step)

The compression step was conducted by the same method as Example 1.

(Surface Crosslinking Step)

80 g of the base resin normal particles of Preparation Example 1 and 20 g of the compressed fine powder reassembly normal particles were mixed, and a mixed solution comprising 3.7 g of water, 0.1 g of propylene glycol, 0.4 g of ethylene carbonate, 0.4 g of propylene carbonate, and 0.87 g of aluminum sulfate aqueous solution was introduced therein, and mixed for 2 minutes. The mixture was dried at 185° C. for 80 minutes, and then, classified with ASTM standard sieve, and superabsorbent polymer having particle size of greater than 150 μm and 850 μm or less was selected.

Comparative Example 3

(Reassembling Step)

In a high speed mixer rotating at 650 rpm, 300 g of the fine particles obtained in Preparation Example 1, and a mixed solution comprising 120 g of water and 0.15 g of polyethyleneglycol were introduced and mixed for 1 minute, thus preparing fine powder reassembly.

And then, compression and surface crosslinking steps were conducted by the same method as Example 1, thus preparing superabsorbent polymer.

Comparative Example 4

To the monomer mixture of Preparation Example 1, 0.45 g of stearic acid (MP-100, LG Household & Health Care) was mixed to prepare base resin.

And then, compression and surface crosslinking steps were conducted by the same method as Comparative Example 1, thus preparing superabsorbent polymer.

Experimental Example

For the superabsorbent polymers prepared in Examples and Comparative Examples, the properties were evaluated as follows.

Unless otherwise described, all the following property evaluations were progressed under constant temperature constant humidity conditions (23±1° C., relative humidity 50±10%), and a saline solution means a 0.9 wt % sodium chloride (NaCl) aqueous solution.

(1) Centrifuge Retention Capacity (CRC)

Centrifuge retention capacity (CRC) by absorption rate under no load of each polymer was measured according to EDANA WSP 241.3.

Specifically, $W_0$ (g, about 0.2 g) of the superabsorbent polymers were uniformly put in an envelope made of non-woven fabric, and the envelope was sealed, and then, soaked in a 0.9 wt % sodium chloride aqueous solution (saline solution) at room temperature. After 30 minutes, the envelope was drained at 250 G for 3 minutes using a centrifuge, and then, the weight $W_2$ (g) of the envelope was measured. And, after the same operation using an empty envelope without a sample, the weight $W_1$ (g) at that time was measured. Using the obtained weights, CRC (g/g) was calculated according to the following Formula.

$CRC(g/g)=\{[W_2(g)-W_1(g)]/W_0(g)\}-1$ [Mathematical Formula 1]

(2) Absorption Under Pressure (AUP)

Absorption under pressure of 0.7 psi of each polymer was measured according to EDANA method WSP 242.3.

Specifically, a 400 mesh wire netting made of stainless was installed on the bottom of a plastic cylinder with an inner diameter of 60 mm. Under the conditions of room temperature and relative humidity of 50%, $W_0$ (g, 0.90 g) of superabsorbent polymer were uniformly scattered on the wire netting, and a piston that can uniformly give a load of 0.7 psi was put on the superabsorbent polymer. Wherein, as the piston, a piston having an outer diameter slightly smaller than 60 mm was used such that there was no gap with the inner wall of the cylinder, and the movement upward and downward was not hindered. At this time, the weight $W_3$ (g) of the apparatus was measured.

Subsequently, on the inner side of a petri dish having a diameter of 150 mm, a glass filter having a diameter of 90 mm and a thickness of 5 mm was positioned, and a 0.9 wt % sodium chloride aqueous solution (saline solution) was poured on the petri dish. Wherein, the saline solution was poured until the water level of the saline solution became the same level to the upper side of the glass filter. And, one filter paper with a diameter of 90 mm was put thereon. On the filter paper, the above prepared apparatus was mounted, and the liquid was absorbed for 1 hour under load. After 1 hour, the weight $W_4$ (g) was measured.

Using the measured weights, absorption under pressure (g/g) was calculated according to the following Formula.

$AUP(g/g)=[W_4(g)-W_3(g)]/W_0(g)$ [Mathematical Formula 2]

(3) Bulk Density (B/D)

Bulk density was measured according to WSP 250.3 method.

More specifically, 100 g of each superabsorbent polymer of Examples and Comparative Examples were flowed through the orifice of standard flowmeter and received in a container with a volume of 100 ml, and shaved such that the superabsorbent polymer became horizontal, and the volume of the superabsorbent polymer was adjusted to 100 ml, and then, the weight of superabsorbent polymer except the container was measured. And, the weight of the superabsorbent polymer was divided by the volume of the superabsorbent polymer, 100 ml, to obtain bulk density corresponding to the weight of superabsorbent polymer per unit volume.

(4) Flowability

Flowability was measured according to EDANA method WSP 250.3.

More specifically, superabsorbent polymer particles were sufficiently mixed so that particle size distribution may become uniform, and then, 100±0.5 g of the sample was taken and poured into a 250 ml beaker.

On the lower stage of a funnel, a cup for measuring density was positioned right in the middle, and then, the opening of the funnel was closed and the weighed sample was lightly poured into the funnel and filled. The moment the closed opening of the funnel was opened, a stop watch was operated to measure a time (t, sec) taken until the whole sample reach the lowest part of the funnel. All the processes were progressed in a constant temperature constant humidity chamber (temperature 23±2° C., relative humidity 45±10%).

Flowability was calculated by the following Formula 1.

Flowability=100/$t$ (g/sec) [Formula 1]

TABLE 1

| | Bulk density (g/ml) | Flowability (g/sec) | CRC (g/g) | 0.7 psi AUP (g/g) |
|---|---|---|---|---|
| Example 1 | 0.73 | 12.12 | 37.6 | 24.1 |
| Example 2 | 0.74 | 12.44 | 36.9 | 24.4 |
| Example 3 | 0.73 | 12.09 | 37.3 | 24.3 |
| Example 4 | 0.74 | 12.62 | 37.5 | 24.6 |
| Example 5 | 0.73 | 12.05 | 35.1 | 24.6 |
| Comparative Example 1 | 0.70 | 10.56 | 37.3 | 24.6 |
| Comparative Example 2 | 0.71 | 10.56 | 35.2 | 24.6 |
| Comparative Example 3 | 0.70 | 10.56 | 36.8 | 24.1 |
| Comparative Example 4 | 0.71 | 10.84 | 37.1 | 24.0 |

Referring to Table 1, it was confirmed that in the case of stearic acid is mixed to prepare fine powder reassembly according to the embodiment of the invention, appropriate hydrophobicity is given to the surface of fine powder reassembly, thus obtaining fine powder reassembly with improved bulk density and flowability. In the case of Comparative Examples 1 to 4, bulk density and flowability were inferior to Examples, and due to high load in the compressor and dryer, it was difficult for the process to be smoothly progressed.

What is claimed is:

1. A method for preparing superabsorbent polymer, comprising:
   preparing a monomer composition comprising acrylic acid based monomers having acid groups of which at least a part are neutralized, an internal crosslinking agent, and a polymerization initiator;
   conducting crosslinking polymerization of the monomer composition to form hydrogel polymer;
   drying and grinding the hydrogel polymer, and classifying into base resin normal particles having particle diameters greater than 150 μm and 850 μm or less, and fine powders having particle diameters of 150 μm or less; and
   mixing the fine powders with stearic acid or salts thereof to prepare fine powder reassembly.

2. The method for preparing superabsorbent polymer according to claim 1, wherein the stearic acid or salts thereof are mixed in a content of 0.05 to 0.30 parts by weight, based on 100 parts by the weight of the fine powders.

3. The method for preparing superabsorbent polymer according to claim 1, wherein the stearic acid or salts thereof are dry mixed in a solid state, or dissolved in a solvent and mixed in solution form, or the stearic acid or salts thereof are heated above a melting temperature and mixed in a molten state.

4. The method for preparing superabsorbent polymer according to claim 1, wherein the superabsorbent polymer has bulk density of 0.72 g/ml or more.

5. The method for preparing superabsorbent polymer according to claim 1, further comprising mixing the fine powder reassembly with the base resin normal particles.

6. The method for preparing superabsorbent polymer according to claim 5, wherein the mixing the fine powder reassembly with the base resin normal particles comprises:

drying and grinding the fine powder reassembly and classifying into fine powder reassembly having particle diameters of 150 μm or less and normal particle reassembly having particle diameters greater than 150 μm and 850 μm or less; and mixing the normal particle reassembly with the base resin normal particles.

7. The method for preparing superabsorbent polymer according to claim 1, further comprising compressing, grinding and classifying the fine powder reassembly to prepare compressed fine powder reassembly.

8. The method for preparing superabsorbent polymer according to claim 1, further comprising conducting surface crosslinking of the fine powder reassembly or compressed fine powder reassembly.

* * * * *